United States Patent
Ota et al.

(10) Patent No.: US 10,295,050 B2
(45) Date of Patent: May 21, 2019

(54) CONTROLLER FOR AUTOMATIC TRANSMISSION

(71) Applicant: TOYOTA JIDOSHA KABUSHIKI KAISHA, Toyota-shi, Aichi-ken (JP)

(72) Inventors: Keisuke Ota, Toyota (JP); Ayumu Sagawa, Toyota (JP); Tomoya Iwami, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 15/646,388

(22) Filed: Jul. 11, 2017

(65) Prior Publication Data

US 2018/0023695 A1 Jan. 25, 2018

(30) Foreign Application Priority Data

Jul. 20, 2016 (JP) ................. 2016-142308

(51) Int. Cl.
*F16H 61/04* (2006.01)
*F16H 61/02* (2006.01)
(Continued)

(52) U.S. Cl.
CPC ..... *F16H 61/0213* (2013.01); *F16H 61/0437* (2013.01); *F16H 61/682* (2013.01); *F16H 61/686* (2013.01); *F16H 3/666* (2013.01); *F16H 59/40* (2013.01); *F16H 59/42* (2013.01); *F16H 2061/0444* (2013.01); *F16H 2061/0451* (2013.01); *F16H 2200/006* (2013.01); *F16H 2200/201* (2013.01); *F16H 2200/2046* (2013.01); *F16H 2306/14* (2013.01)

(58) Field of Classification Search
CPC ......... F16H 61/0213; F16H 2061/0444; F16H 2061/0451; F16H 2306/14
See application file for complete search history.

(56) References Cited

U.S. PATENT DOCUMENTS 7,318,789 B2 * 1/2008 Saitou ................. F16H 61/061 477/143
7,563,198 B2 * 7/2009 Ayabe .................. F16H 59/46 477/132

(Continued)

FOREIGN PATENT DOCUMENTS

CN 104718402 A 6/2015
JP 2012-251581 A 12/2012
(Continued)

*Primary Examiner* — David R Morris
(74) *Attorney, Agent, or Firm* — Oliff PLC

(57) ABSTRACT

When a jump downshift via an intermediate shift stage is requested and a rotation speed of an input shaft approaches a synchronous rotation speed of the intermediate shift stage, a target torque phase time when the gear shift via the intermediate shift stage is performed with input switching is set to be shorter than that when the gear shift via the intermediate shift stage is performed without using input switching and torque phase control is performed. Accordingly, it is possible to promptly perform engagement of an engagement-side frictional engagement element at the time of passing through the intermediate shift stage and to rapidly perform the gear shift after passing through the intermediate shift stage.

3 Claims, 7 Drawing Sheets

(51) Int. Cl.
    *F16H 61/682*     (2006.01)
    *F16H 61/686*     (2006.01)
    *F16H 3/66*     (2006.01)
    *F16H 59/40*     (2006.01)
    *F16H 59/42*     (2006.01)

(56) References Cited

U.S. PATENT DOCUMENTS

| | | | | |
|---|---|---|---|---|
| 7,780,570 | B2 * | 8/2010 | Iwatsuki | B60W 10/06 477/132 |
| 2005/0221956 | A1 * | 10/2005 | Saitou | F16H 61/061 477/156 |
| 2007/0117676 | A1 * | 5/2007 | Ayabe | F16H 59/46 477/34 |
| 2008/0146413 | A1 * | 6/2008 | Iwatsuki | B60W 10/06 477/108 |
| 2018/0023697 | A1 * | 1/2018 | Ota | F16H 61/686 701/51 |
| 2018/0266547 | A1 * | 9/2018 | Ota | F16H 61/04 |

FOREIGN PATENT DOCUMENTS

| | | |
|---|---|---|
| JP | 2015-148322 A | 8/2015 |
| WO | 2014/111810 A1 | 7/2014 |

\* cited by examiner

FIG. 3

|      | C1 | C2 | C3 | C4 | B1 | B2 |
|------|----|----|----|----|----|----|
| 1st  | ○  |    |    |    |    | ○  |
| 2nd  | ○  |    |    |    | ○  |    |
| 3rd  | ○  |    | ○  |    |    |    |
| 4th  | ○  |    |    | ○  |    |    |
| 5th  | ○  | ○  |    |    |    |    |
| 6th  |    | ○  |    | ○  |    |    |
| 7th  |    | ○  | ○  |    |    |    |
| 8th  |    | ○  |    |    | ○  |    |
| Rev  |    |    | ○  |    |    | ○  |

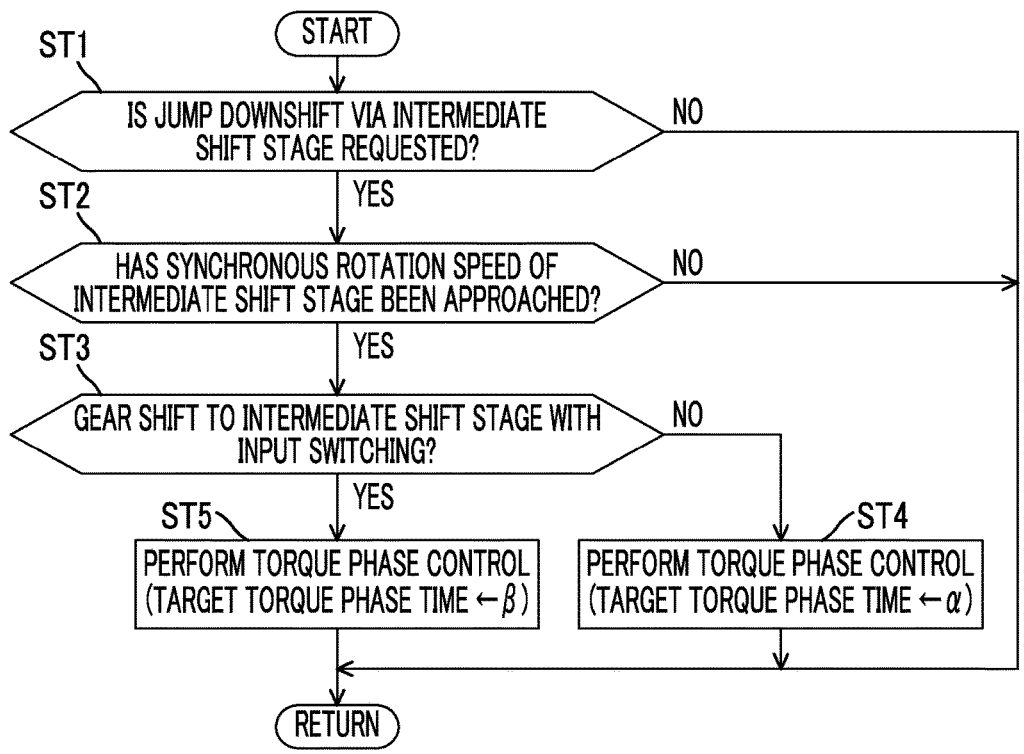

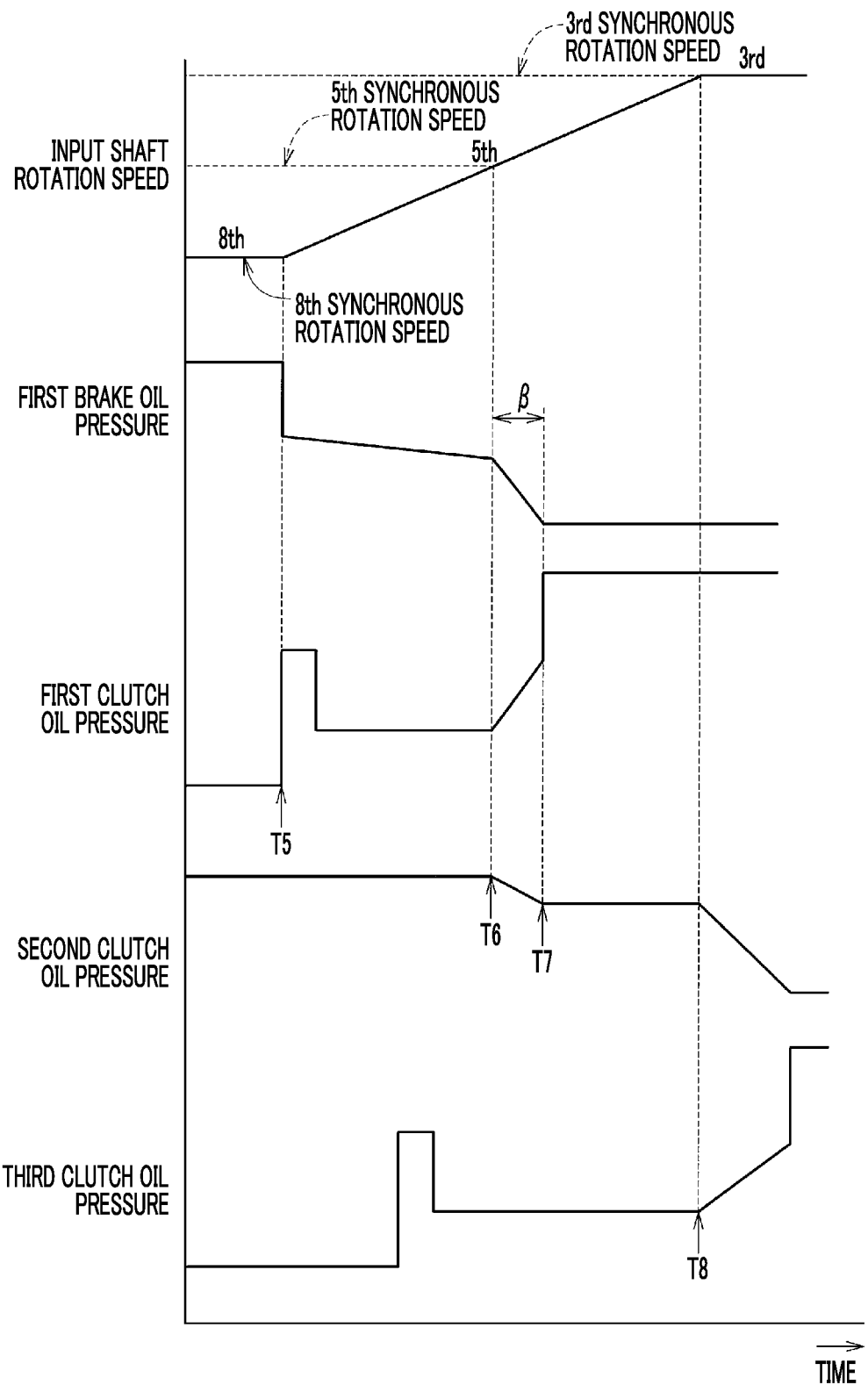

CONTROLLER FOR AUTOMATIC TRANSMISSION

INCORPORATION BY REFERENCE

The disclosure of Japanese Patent Application No. 2016-142308 filed on Jul. 20, 2016 including the specification, drawings and abstract is incorporated herein by reference in its entirety.

BACKGROUND

1. Technical Field

The disclosure relates to a controller for an automatic transmission. Particularly, the disclosure relates to gear shift control when a gear shift via an intermediate shift stage in a stepped automatic transmission is performed.

2. Description of Related Art

With a recent increase in the number of shift stages of an automatic transmission, a gear shift of the automatic transmission has more often been performed by a jump gear shift (for example, a gear shift from a current shift stage to a shift stage lower by two or more stages from the current shift stage at the time of a power-on downshift).

When such a jump gear shift is performed, there is a likelihood that a change in rotation speed of frictional engagement elements due to engagement and disengagement of the frictional engagement elements will increase and a quantity of heat generated due to sliding of friction materials between the frictional engagement elements (hereinafter also referred to as a clutch heat quantity) will increase. Therefore, in order to decrease the clutch heat quantity, the gear shift is performed via another shift stage (hereinafter also referred to as an intermediate shift stage) between a shift stage before the gear shift and a required shift stage which is required depending on driving conditions such as an accelerator depression amount.

Japanese Patent Application Publication No. 2015-148322 (JP 2015-148322 A) discloses a technique of performing a gear shift via an intermediate shift stage between a shift stage before the gear shift and a required shift stage.

SUMMARY

Such a jump gear shift via an intermediate shift stage may be accompanied by input switching in the middle of the gear shift. Specifically, when two input clutches (a first clutch and a second clutch) that can transmit power from a driving force source to a gear shift unit of the automatic transmission (for example, a gear shift unit constituted by a planetary gear mechanism) are used as engagement maintaining elements in an engaged state, a predetermined shift stage is set by the engaged state of the engagement maintaining element, a disengagement-side frictional engagement element, and an engagement-side frictional engagement element. At this time, a case in which the engagement maintaining element is switched is referred to as input switching. That is, when an input clutch (an engagement maintaining element) varies between a gear shift from a shift stage before the gear shift to an intermediate shift stage and a gear shift from the intermediate shift stage to a target shift stage, it is necessary to switch the input clutch, which is referred to as input switching. Accordingly, in an automatic transmission having such a configuration, a gear shift may be performed via the intermediate shift stage by switching the input clutch between the first clutch and the second clutch (with input switching).

When a gear shift is performed via an intermediate shift stage with input switching in this way, it is necessary to perform control of an engagement-side frictional engagement element in input switching with high accuracy in order to increase a driving force in a phase subsequent to the middle of a gear shift operation while preventing occurrence of a gear shift shock.

A technique of increasing a driving force in the middle of a gear shift operation by controlling an engagement-side frictional engagement element (an input clutch to be engaged) with high accuracy when the gear shift is performed via an intermediate shift stage with input switching has not been proposed yet. For example, Japanese Patent Application Publication No. 2012-251581 (JP 2012-251581 A) discloses a technique of improving comfort at the time of a gear shift by controlling frictional engagement elements using a target torque phase time which is calculated based on an accelerator depression amount and a vehicle speed. However, in JP 2012-251581 A, smoothly realizing a gear shift via an intermediate shift stage, particularly, a gear shift via an intermediate shift stage with input switching by adjusting the target torque phase time has not been taken into consideration.

The disclosure provides a controller for an automatic transmission that can increase a driving force in a phase subsequent to the middle of a gear shift operation while preventing occurrence of a gear shift shock and rapidly perform a gear shift after passing through an intermediate shift stage when a jump gear shift via the intermediate shift stage is performed with input switching.

An embodiment of the disclosure is based on a premise of a controller which is applied to a stepped automatic transmission which includes a plurality of frictional engagement elements serving as an engagement maintaining element capable of transmitting power from a driving force source to a gear shift unit, which sets one of a plurality of shift stages by selectively causing the plurality of frictional engagement elements including such frictional engagement elements to engage with each other, and which can perform a gear shift via an intermediate shift stage between a current shift stage and a required shift stage required depending on driving conditions when a gear shift is requested and a shift stage difference of two or more stages is present between the two shift stages. The controller includes a torque phase control unit that replaces a disengagement-side frictional engagement element and an engagement-side frictional engagement element at the time of a gear shift. When input switching in which the frictional engagement element serving as the engagement maintaining element is switched at the time of a gear shift via the intermediate shift stage occurs in the course of performing the gear shift via the intermediate shift stage, the torque phase control unit is configured to perform the torque phase control in which a torque phase control execution time is shorter than that when input switching does not occur.

According to this feature, when input switching occurs at the time of a gear shift via an intermediate shift stage, the torque phase control in which the torque phase control execution time is shorter than that when input switching does not occur is performed. Accordingly, when a gear shift is performed via an intermediate shift stage accompanied with input switching, the engagement of the engagement-side frictional engagement element can be promptly performed and it is thus possible to rapidly perform a gear shift after passing through the intermediate shift stage.

When input switching occurs in the course of performing a gear shift via an intermediate shift stage at the time of requesting a power-on downshift and at the time of requesting a power-off upshift, it is preferable that the torque phase control unit be configured to perform the torque phase control in which the torque phase control execution time is shorter than that when input switching does not occur.

A high-speed response is required for a gear shift operation at the time of requesting a power-on downshift and at the time of requesting a power-off upshift. Accordingly, when such a request occurs, it is possible to perform a gear shift in high-speed response to the request by setting the torque phase control execution time to be shorter (setting the torque phase control execution time to be shorter when input switching occurs) as described above and performing the torque phase control to rapidly perform the gear shift after passing through an intermediate shift stage.

The torque phase control unit serves to set a target torque phase time and to perform the torque phase control, and it is preferable that the torque phase control unit be configured to set a target torque phase time which is shorter when input switching in which a frictional engagement element serving as an engagement maintaining element is switched at the time of passing through an intermediate shift stage occurs than that when the input switching does not occur.

As a result, it is possible to embody means for changing the torque phase control execution time.

According to the disclosure, when input switching in which a frictional engagement element serving as an engagement maintaining element capable of transmitting power from a driving force source to a gear shift unit is switched at the time of passing through an intermediate shift stage occurs in the course of performing a gear shift via the intermediate shift stage, the torque phase control in which the torque phase control execution time which is shorter than that when the input switching does not occur is performed. Accordingly, it is possible to promptly perform engagement of an engagement-side frictional engagement element at the time of passing an intermediate shift stage accompanied with input switching and to rapidly perform the gear shift after passing through the intermediate shift stage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an engagement table illustrating engagement states of first to fourth clutches, a first brake, and a second brake for each shift stage in the automatic transmission;

FIG. 5 is a flowchart illustrating a torque phase control routine according to the embodiment;

FIG. 6 is a diagram illustrating an example of a change in a shift stage when a jump downshift via an intermediate shift stage is performed;

FIG. 8 is a timing chart illustrating changes of an input shaft rotation speed and hydraulic instruction values of frictional engagement elements at the time of a jump downshift from an eighth shift stage to a third shift stage using a fifth shift stage as an intermediate shift stage.

DETAILED DESCRIPTION OF EMBODIMENTS

Hereinafter, an embodiment of the disclosure will be described with reference to the accompanying drawings.

First, a vehicle 100 according to e embodiment will be described below with reference to FIGS. 1 to 4.

Figure 1:
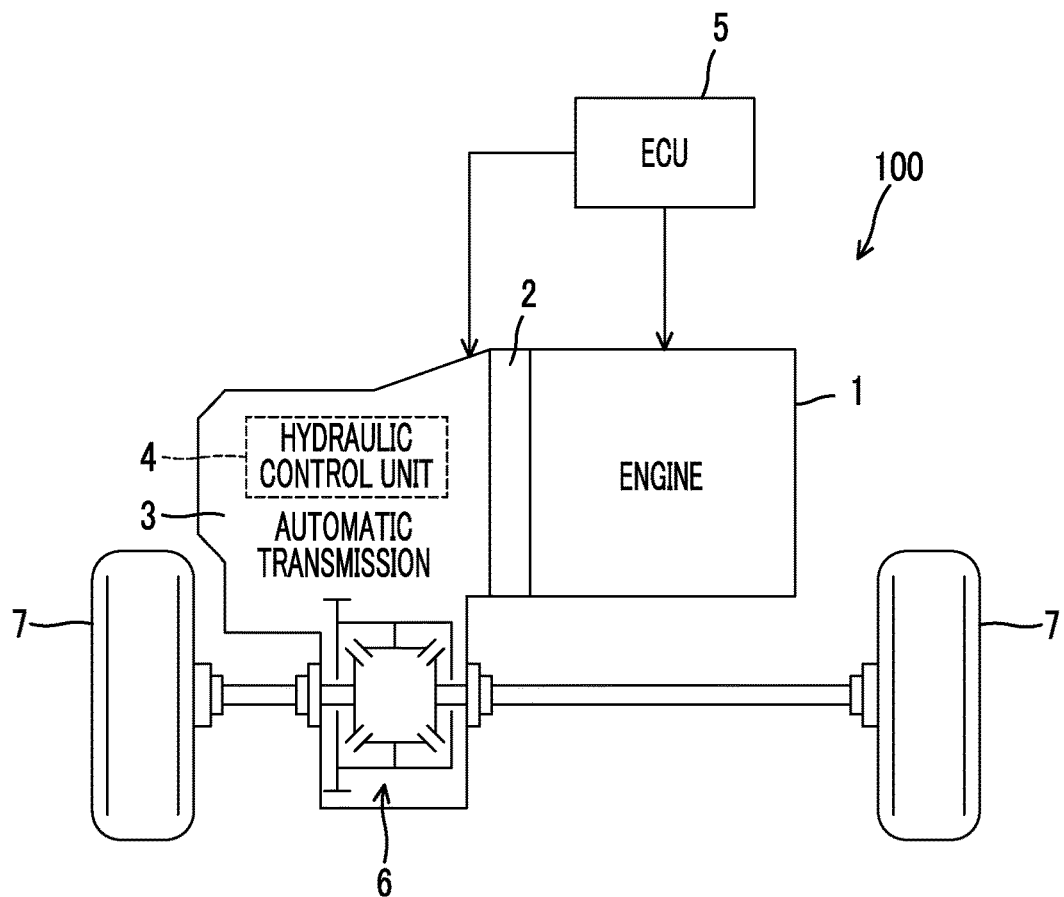
FIG. 1 is a diagram schematically illustrating a configuration of a drive system of a vehicle according to an embodiment.

As illustrated in FIG. 1, the vehicle 100 includes an engine 1, a torque converter 2, an automatic transmission 3, a hydraulic control unit 4, and an electronic control unit (ECU) 5. The vehicle 100 is, for example, of a front engine-front drive (FF) type and is configured such that an output of the engine 1 is transmitted to a differential device 6 via the torque converter 2 and the automatic transmission 3 and is assigned to right and left driving wheels (front wheels) 7.

Engine—The engine (internal combustion engine) 1 is a driving force source for traveling and is, for example, a multi-cylinder gasoline engine. The engine 1 is configured such that an operation state thereof can be controlled based on a throttle opening level (an amount of intake air) of a throttle valve, an amount of fuel injected, an ignition timing, and the like.

Figure 2:
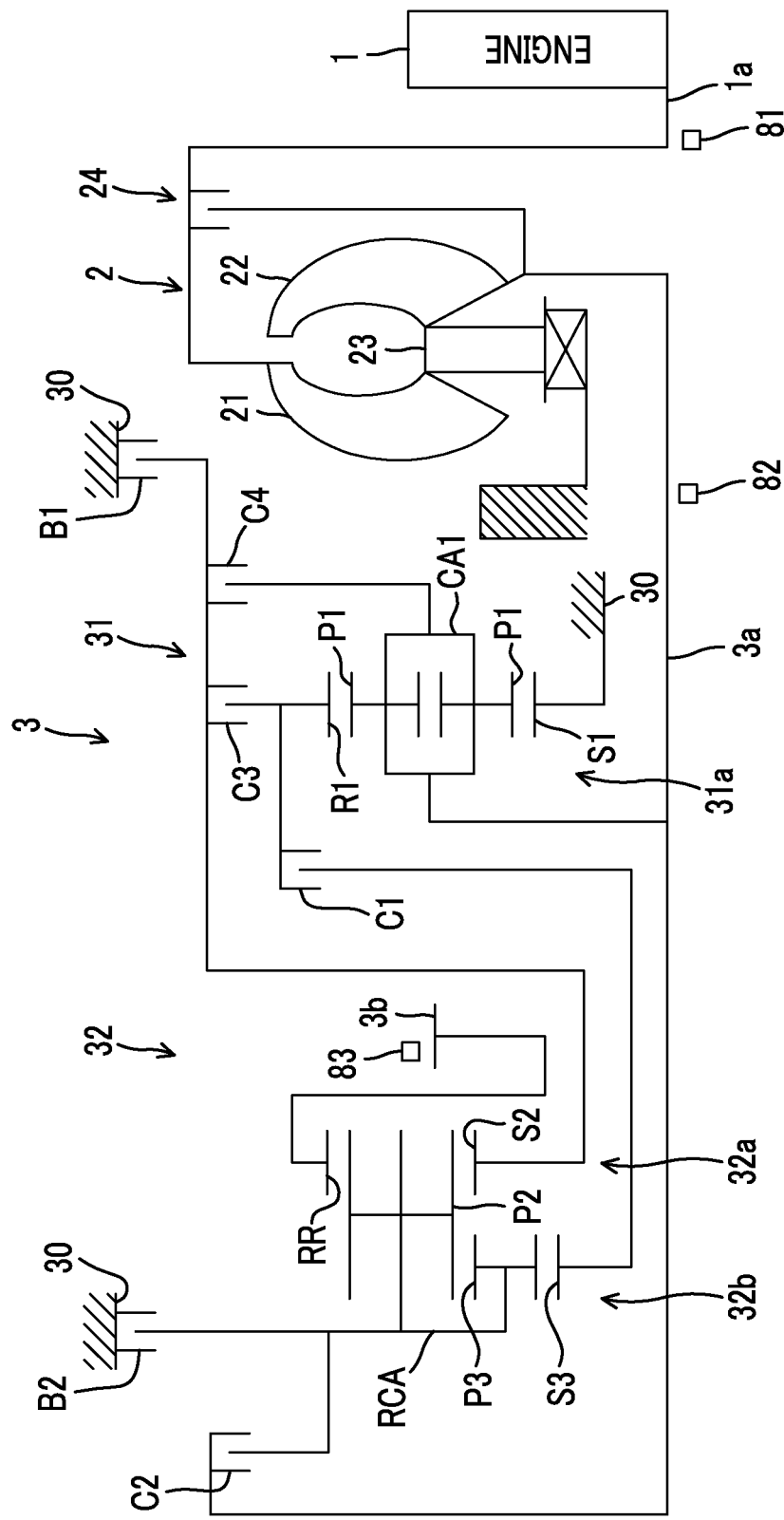
FIG. 2 is a skeleton diagram illustrating a configuration of a torque converter and an automatic transmission.

Torque converter—As illustrated in FIG. 2, the torque converter 2 includes a pump impeller 21 that is connected to a crank shaft 1a which is an output shaft of the engine 1, a turbine runner 22 that is connected to the automatic transmission 3, a stator 23 that has a torque amplifying function, and a lock-up clutch 24 that directly connects the engine 1 and the automatic transmission 3 to each other. In FIG. 2, a lower half below a rotation axis of the torque converter 2 and the automatic transmission 3 is omitted and only an upper half is schematically illustrated.

Automatic transmission—The automatic transmission 3 is disposed in a power transmission path between the engine 1 and the driving wheels 7 and is configured to change a rotation speed of an input shaft 3a and to output the changed rotation speed to an output shaft 3b. In the automatic transmission 3, the input shaft 3a is connected to the turbine runner 22 of the torque converter 2, and the output shaft 3b is connected to the driving wheels 7 via the differential device 6 or the like.

The automatic transmission 3 includes a first gear shift unit (a front planetary) 31 that includes a first planetary gear mechanism 31a as a main element, a second gear shift unit (a rear planetary) 32 that includes a second planetary gear mechanism 32a and a third planetary gear mechanism 32b as a main element, first to fourth clutches C1 to C4, a first brake B1, and a second brake B2.

The first planetary gear mechanism 31a constituting the first gear shift unit 31 is a double pinion type planetary gear mechanism and includes a sun gear S1, a plurality of pairs of pinion gears P1 that engage with each other, a planetary carrier CA1 that supports the pinion gears P1 such that they can rotate and revolve, and a ring gear R1 that engages with the sun gear S1 via the pinion gears P1.

The planetary carrier CA1 is connected to the input shaft 3a and integrally rotates along with the input shaft 3a. The sun gear S1 is fixed to a transmission case 30 and is not rotatable. The ring gear R1 serves as an intermediate output member and reduces the rotation speed of the input shaft 3a and transmits the reduced rotation speed to the second gear shift unit 32.

The second planetary gear mechanism 32a constituting the second gear shift unit 32 is a single pinion type planetary gear mechanism and includes a sun gear S2, a pinion gear P2, a planetary carrier RCA that supports the pinion gear P2 such that it can rotate and revolve, and a ring gear RR that engages with the sun gear S2 via the pinion gear P2.

The third planetary gear mechanism 32b constituting the second gear shift unit 32 is a double pinion type planetary gear mechanism and includes a sun gear S3, a plurality of pairs of pinion gears P2 and P3 that engage with each other, a planetary carrier RCA that supports the pinion gears P2 and P3 such that they can rotate and revolve, and a ring gear RR that engages with the sun gear S3 via the pinion gears P2 and P3. The planetary carrier RCA and the ring gear RR are shared by the second planetary gear mechanism 32a and the third planetary gear mechanism 32b.

The sun gear S2 is selectively connected to the transmission case 30 by the first brake B1. The sun gear S2 is selectively connected to the ring gear R1 via the third clutch C3. The sun gear S2 is further selectively connected to the planetary carrier CA1 via the fourth clutch C4. The sun gear S3 is selectively connected to the ring gear R1 via the first clutch C1. The planetary carrier RCA is selectively connected to the transmission case 30 by the second brake B2. The planetary carrier RCA is selectively connected to the input shaft 3a via the second clutch C2. The ring gear RR is connected to the output shaft 3b and integrally rotates along with the output shaft 3b.

The first to fourth clutches C1 to C4, the first brake B1, and the second brake B2 are frictional engagement elements that are frictionally engaged by hydraulic actuators and are controlled by the hydraulic control unit 4 and the ECU 5.

FIG. 3 is an engagement table illustrating engaged states or disengaged states of the first to fourth clutches C1 to C4, the first brake B1, and the second brake B2 for each shift stage (each gear stage). In the engagement table illustrated in FIG. 3, mark O denotes an "engaged state" and a blank denotes a "disengaged state."

As illustrated in FIG. 3, in the automatic transmission 3 according to this embodiment, the first clutch C1 and the second brake B2 engage with each other to set a first shift stage (1st) having a largest gear ratio (the rotation speed of the input shaft 3a/the rotation speed of the output shaft 3b). The first clutch C1 and the first brake B1 engage with each other to set a second shift stage (2nd).

The first clutch C1 and the third clutch C3 engage with each other to set a third shift stage (3rd). The first clutch C1 and the fourth clutch C4 engage with each other to set a fourth shift stage (4th). The first clutch C1 and the second clutch C2 engage with each other to set a fifth shift stage (5th). The second clutch C2 and the fourth clutch C4 engage with each other to set a sixth shift stage (6th). The second clutch C2 and the third clutch C3 engage with each other to set a seventh shift stage (7th). The second clutch C2 and the first brake B1 engage with each other to set an eighth shift stage (8th). The third clutch C3 and the second brake B2 engage with each other to set a reverse shift stage (Rev).

Hydraulic control unit—The hydraulic control unit 4 is provided to control states (an engaged state or a disengaged state) of the frictional engagement elements of the automatic transmission 3. The hydraulic control unit 4 also has a function of controlling the lock-up clutch 24 of the torque converter 2.

Figure 4:
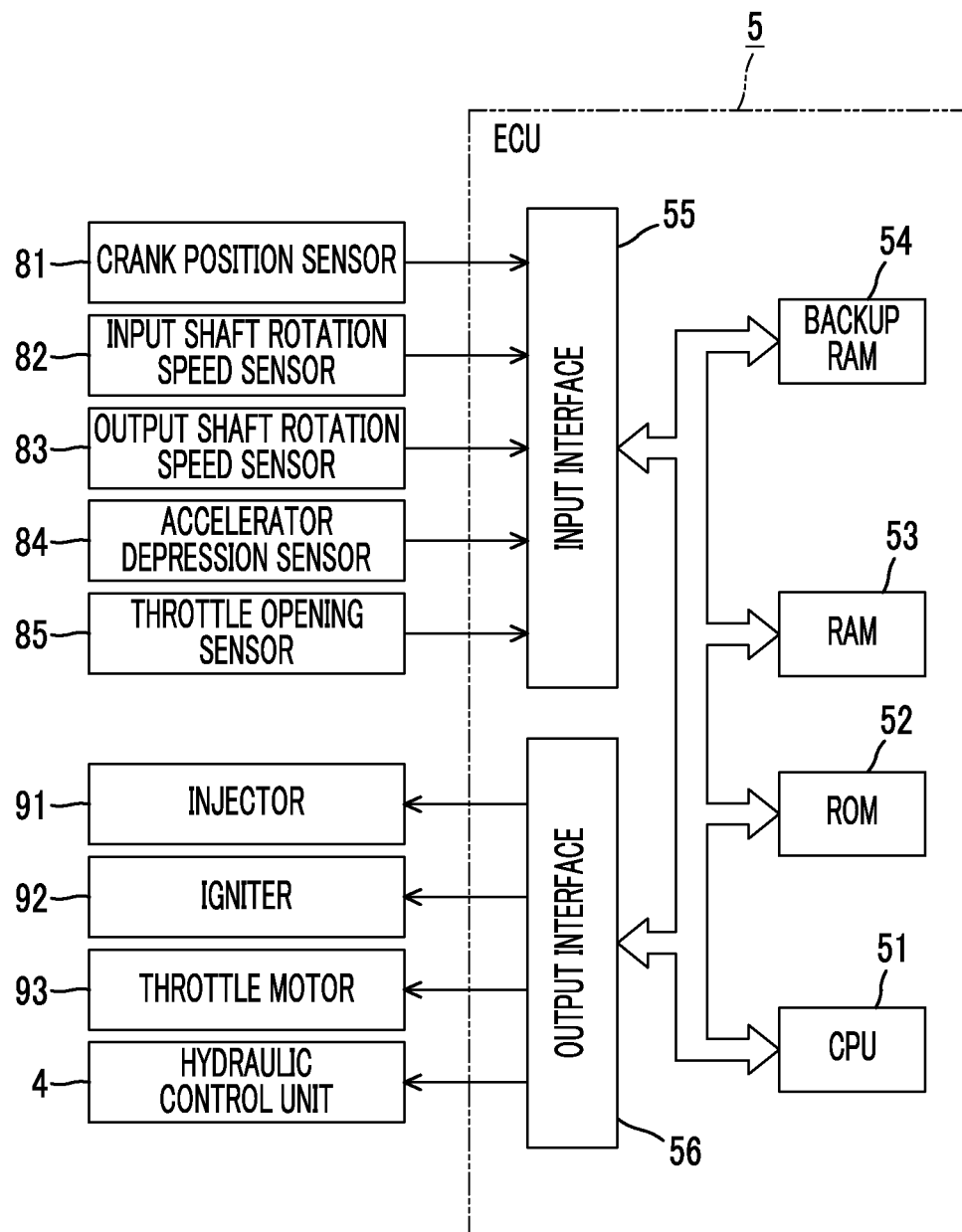
FIG. 4 is a block diagram illustrating a configuration of a control system of the vehicle.

ECU—The ECU 5 is configured to perform operation control of the engine 1, gear shift control of the automatic transmission 3, and the like. Specifically, as illustrated in FIG. 4, the ECU 5 includes a CPU 51, a ROM 52, a RAM 53, a backup RAM 54, an input interface 55, and an output interface 56. The ECU 5 is an example of the "electronic control unit" in the claims.

The CPU 51 performs an arithmetic process based on various control programs or maps stored in the ROM 52. In the ROM 52, various control programs, maps which are referred to when the control programs are executed, and the like are stored. The RAM 53 is a memory that temporarily stores process results of the CPU 51, detection results of various sensors, and the like. The backup RAM 54 is a nonvolatile memory that stores data to be stored when the ignition is turned off.

The input interface 55 is connected to a crank position sensor 81, an input shaft rotation speed sensor 82, an output shaft rotation speed sensor 83, an accelerator depression sensor 84, a throttle opening sensor 85, and the like.

The crank position sensor 81 is provided to calculate a rotation speed of the engine 1. The input shaft rotation speed sensor 82 is provided to calculate a rotation speed of the input shall 3a (a turbine rotation speed) of the automatic transmission 3. The output shaft rotation speed sensor 83 is provided to calculate a rotation speed of the output shaft 3b of the automatic transmission 3. A vehicle speed can be calculated from the rotation speed of the output shaft 3b. The accelerator depression sensor 84 is provided to detect an accelerator depression amount which is a depression amount (an operation amount) of an accelerator pedal. The throttle opening sensor 85 is provided to detect a throttle opening level of a throttle valve.

The output interface 56 is connected to an injector 91, an igniter 92, a throttle motor 93, the hydraulic control unit 4, and the like. The injector 91 is a fuel injection valve and an amount of fuel injected therefrom can be adjusted. The igniter 92 is provided to adjust an ignition timing using an ignition plug. The throttle motor 93 is provided to adjust the throttle opening level of the throttle valve.

The ECU 5 is configured to control the operation state of the engine 1 by controlling the throttle opening level, the amount of fuel injected, the ignition timing, and the like based on the detection results of various sensors and the like. The ECU 5 is configured to perform gear shift control of the automatic transmission 3 and control of the lock-up clutch 24 of the torque converter 2 by controlling the hydraulic control unit 4.

In the gear shift control by the ECU 5, a required shift stage is set, for example, based on a gear shift map with the vehicle speed and the accelerator depression amount as parameters, and the hydraulic control unit 4 is controlled such that an actual shift stage is the required shift stage.

Gear shift control using gear shift model—Before describing control (torque phase control in a jump gear shift) by which this embodiment is characterized, gear shift control for determining a control operation amount by which a gear shift target value is realized in the automatic transmission 3 will be schematically described below.

As a general gear shift control, for example, a technique of determining a torque capacity (or a hydraulic pressure command value) of each frictional engagement element at a gear shift time and performing a gear shift based on a predetermined control map which has been determined in advance by adaptation while evaluating whether a gear shift shock, a shifting time, or the like is appropriate in an actual vehicle is known. In the technique using the control map, it is necessary to prepare a plurality of control maps depending on a gear shift pattern of a power-on downshift, a power-off upshift, or the like and a combination of shift stages before and after the gear shift. Accordingly, greater labor is required for adaptation work as the number of shift stages of the automatic transmission becomes larger.

Therefore, in this embodiment, a technique of performing a gear shift using a gear shift model for determining a control operation amount by which the gear shift target value is realized is employed as the gear shift control instead of the technique using the control map. The gear shift target value is a target value of a factor (such as a shifting time or a driving force) for determining a change mode to be realized at the time of a gear shift. The control operation amount is a value required during operation for a factor (such as an engine torque or a clutch torque) to reach a control target.

The gear shift control using a gear shift model will be described below. Equations of motion during the gear shift are expressed by Equations (1) and (2).

$$d\omega t/dt = a1 \cdot Tt + b1 \cdot Tcapl + c1 \cdot Tcdrn + d1 \cdot d\omega o/dt \quad (1)$$

$$To = a2 \cdot Tt + b2 \cdot Tcapl + c2 \cdot Tcdrn + d2 \cdot d\omega o/dt \quad (2)$$

Equations (1) and (2) are derived from equations of motion of connected rotary elements constituting the automatic transmission 3 and relational expressions of the planetary gear mechanisms constituting the automatic transmission 3. The equation of motion of each rotary element is an equation of motion in which a torque which is expressed by a product of a moment of inertia and a change rate of a rotation speed in each rotary element is defined by a torque acting on a member associated with the rotary element among three members of the planetary gear mechanism and both members of each frictional engagement element. The relational expressions in the planetary gear mechanism are relational expressions in which a torque relationship between three members and a relationship in rotation speed change rate in the planetary gear mechanism are defined using a gear ratio of the planetary gear mechanism.

In Equations (1) and (2), $d\omega t/dt$ is a derivative with respect to time, that is, a change rate, of a turbine rotation speed (a rotational angular velocity) $\omega t$ (that is, an input shaft rotation speed $\omega i$ of the automatic transmission) and denotes an acceleration of the input shaft $3a$ (an angular acceleration which is hereinafter referred to as an input shaft acceleration) as a change in speed of a rotary member on the input shaft $3a$ side. $d\omega o/dt$ is a change rate of an output shaft rotation speed $\omega o$ of the automatic transmission and denotes an output shaft acceleration. Tt denotes a turbine torque which is a torque on the input shaft $3a$ as a torque on a rotary member on the input shaft $3a$ side, that is, a transmission input torque Ti. The turbine torque Tt has the same meaning as an engine torque Te ($=Tt/t$) in consideration of a torque ratio t of the torque converter 2. To denotes a transmission output torque which is a torque on the output shaft $3b$ as a torque on a rotary member on the output shaft $3b$ side. Tcapl denotes a torque capacity of a frictional engagement element that performs an engagement operation at the gear shift time (hereinafter referred to as an engagement-side clutch torque). Tcdrn denotes a torque capacity of a frictional engagement element that performs a disengagement operation at the gear shift time (hereinafter referred to as a disengagement-side clutch torque). Here, a1, a2, b1, b2, c1, c2, d1, and d2 are constants when Equations (1) and (2) are derived and are coefficients which are determined in design from the moment of inertia of each rotary element and the gear ratio of the planetary gear mechanism. Specific numerical values of the constants vary, for example, depending on a gear shift type (for example, a gear shift pattern or a combination of shift stages before and after the gear shift). Accordingly, an equation of motion is individual, but equations of motion corresponding to gear shift types in which the constants differ depending on the gear shift type are used for the gear shift of the automatic transmission 3.

Equations (1) and (2) are gear train equations of motion of the automatic transmission 3 which are obtained by formularizing a relationship between the gear shift target values and the control operation amounts. The gear shift target values can express target values for the shifting time and the driving force and are handled in the gear train equations of motion. In this embodiment, the input shaft acceleration $d\omega t/dt$ is used as an example of a physical quantity that can express the shifting time. The transmission output torque To is used as an example of a physical quantity that can express the driving force. In this embodiment, the gear shift target values are set to two values of the input shaft acceleration $d\omega t/dt$ and the transmission output torque To, respectively.

On the other hand, in this embodiment, the control operation amounts for establishing the gear shift target values are set by three values including the turbine torque Tt (which has the same meaning as the engine torque Te), the engagement-side clutch torque Tcapl, and the disengagement-side clutch torque Tcdrn. Then, since the equations of motion include two equations of Equations (1) and (2) and there are three control operation amounts, the control operation amounts for establishing two gear shift target values do not have unique solutions. The output shaft acceleration $d\omega o/dt$ in the equations is calculated from the transmission output shaft rotation speed $\omega o$ which is a value detected by the output shaft rotation speed sensor 83.

Therefore, research has been conducted on obtaining unique solutions for the control operation amounts by adding limiting conditions to the equations of motion of Equations (1) and (2). In this embodiment, torque assignment proportions of transmission torques assigned to the disengagement-side clutch and the engagement-side clutch are used as the limiting conditions which are suitable for expressing or controlling delivery of a torque during the gear shift and which can cope with any gear shift pattern. That is, the torque assignment proportions of a transmission torque which enable the delivery of a torque during the gear shift to be incorporated into the equations of motion and enable the control operation amounts to have unique solutions are set as the limiting conditions. The torque assignment proportions are proportions of the transmission torques at which a total transmission torque on the input shaft is assigned to both frictional engagement elements when the total transmission torque (a total transmission torque) which needs to be assigned to the disengagement-side clutch and the engagement-side clutch during the gear shift of the automatic transmission 3 is replaced with, for example, the torque on the input shaft $3a$ (the total transmission torque on the input shaft). In this embodiment, when the torque assignment proportion of the engagement-side clutch is defined as "xapl" and the torque assignment proportion of the disengagement-side clutch is defined as "xdrn," Equations (3) and (4) are defined as follows using a torque assignment proportion x (for example, $0 \leq x \leq 1$) varying in a time series to reflect the delivery of a torque during the gear shift.

$$xapl = x \quad (3)$$

$$xdrn = 1 - x \quad (4)$$

The relational expression between the engagement-side clutch torque Tcapl and the disengagement-side clutch torque Tcdrn can be defined using "x" (=xapl) and "1−x" (=xdrn) based on "Tcapl" and "Tcdrn" replaced with the torque on the input shaft 3a and Equations (3) and (4). The relational expressions for calculating the turbine torque Tt, the engagement-side clutch torque Tcapl, and the disengagement-side clutch torque Tcdrn which are the control operation amounts are derived from Equations (1) and (2) and the relational expression between "Tcapl" and "Tcdrn." The turbine torque Tt (which has the same meaning as the engine torque Te) is expressed by a relational expression using "x" (=xapl), "1−x" (=xdrn), the input shaft acceleration dωt/dt, the transmission output torque To, and the like. Similarly, the engagement-side clutch torque Tcapl is expressed by a relational expression using "x" (=xapl), the input shaft acceleration dωt/dt, the transmission output torque To, and the like. Similarly, the disengagement-side clutch torque Tcdrn is expressed by a relational expression using "1−x" (=xdrn), the input shaft acceleration dωt/dt, the transmission output torque To, and the like.

That is, a gear shift model in this embodiment is for calculating the control operation amounts based on the gear shift target values using the equations of motion (Equations (1) and (2)) of the automatic transmission 3 including the gear shift target values and the control operation amounts and the relational expressions (Equations (3) and (4)) indicating the torque assignment proportions. In this way, in this embodiment, the gear shift of the automatic transmission 3 is performed using the gear shift model by adding the limiting conditions set with the torque assignment proportion x to Equations (1) and (2). Accordingly, even when three control operation amounts are present for two gear shift target values, three control operation amounts can be appropriately determined using the gear shift model. Since an equation of motion is individual but gear train equations of motion in which the constants differ depending on the gear shift type (for example, the gear shift pattern or the combination of shift stages before and after the gear shift) are used as described above, the gear shift models corresponding to the gear shift types are used for the gear shift of the automatic transmission 3.

Torque phase control—Torque phase control (control of replacing a disengagement-side frictional engagement element and an engagement-side frictional engagement element) which is a feature of this embodiment will be described below. In this embodiment, a case in which jump downshift control via an intermediate shift stage (particularly, power-on jump downshift control via an intermediate shift stage) is performed as the torque phase control will be described as an example.

The jump downshift control is control for performing a gear shift from a current shift stage to a shift stage lower by two or more stages than the current shift stage, for example, at the time of a power-on jump downshift. Examples thereof include a case in which an accelerator pedal depression amount increases during traveling at the fifth shift stage and a gear shift is performed with a required shift stage set to the second shift stage and a case in which the accelerator pedal depression amount increases during traveling at the eighth shift stage and a gear shift is performed with a required shift stage set to the third shift stage.

In the automatic transmission 3 having a large number of shift stages as in this embodiment, a variation in gear shift ratio before and after a gear shift which can be realized by replacement of a pair of frictional engagement elements (a so-called clutch-to-clutch gear shift) is likely to increase. In this case, a variation in rotation speed of the frictional engagement elements due to disengagement and engagement of the frictional engagement elements increases and a quantity of heat generated due to sliding of friction materials between the frictional engagement elements (a clutch heat quantity) increases.

An example of means for guaranteeing durability (particularly, durability of friction materials) by suppressing an increase in temperature of the frictional engagement elements is to decrease a transmission torque during a gear shift (for example, torque-down control of the engine 1). However, in this case, the driving force during the gear shift may decrease or a variation in the driving force after the gear shift may increase, thereby causing degradation in drivability. Another example of the means for guaranteeing the durability is to increase a heat capacity of the frictional engagement elements. However, in this case, an increase in size of the frictional engagement elements is caused. As a result, an increase in size and weight of the automatic transmission 3, an increase in manufacturing cost, degradation in power transmission efficiency, and the like are caused.

In order to solve this problem, when a jump downshift request occurs, a gear shift is performed via another shift stage (an intermediate shift stage) between a shift stage before the gear shift and a required shift stage set based on the gear shift map.

In the jump downshift via an intermediate shift stage, input switching may be accompanied during the gear shift. Specifically, in the automatic transmission 3 according to this embodiment, the first clutch C1 and the second clutch C2 have a function of an input clutch (a plurality of frictional engagement elements serving as an engagement maintaining element that can transmit power from a driving three source to a gear shift unit in the claims) that transmits power from the engine 1 to the second gear shift unit 32 of the automatic transmission 3 in an engaged state. That is, when the input clutch (the first clutch and the second clutch) is used as the engagement maintaining element, a predetermined shift stage is set by the engaged state of the engagement maintaining element, a disengagement-side frictional engagement element, and an engagement-side frictional engagement element. At this time, the case in which the engagement maintaining element is switched is referred to as input switching. Accordingly, when the input clutch (the engagement maintaining element) differs in a gear shift from a shift stage before the gear shift to an intermediate shift stage and a gear shift from the intermediate shift stage to a target shift stage, it is necessary to switch the input clutch, which is referred to as input switching. Accordingly, in the automatic transmission 3 having this configuration, the gear shift may be performed via the intermediate shift stage by switching the input clutch between the first clutch and the second clutch (accompanied with input switching).

For example, when a jump downshift from the eighth shift stage to the third shift stage is performed via the fifth shift stage as an intermediate shift stage, the input clutch is switched from the second clutch C2 to the first clutch C1 at the time of passing through the fifth shift stage.

When a gear shift is performed via an intermediate shift stage accompanied with input switching in this way, it is necessary to control the engagement-side frictional engagement element in input switching with high accuracy in order to increase a driving force in a phase subsequent to the middle of a gear shift operation while preventing occurrence of a gear shift shock.

A technique of increasing a driving force in a phase subsequent to the middle of the gear shift operation while preventing occurrence of a gear shift shock by controlling the engagement-side frictional engagement element (the input clutch to be engaged) with high accuracy when the gear shift is performed via the intermediate shift stage with input switching has not been proposed yet.

This embodiment is made in consideration of these circumstances and is to increase a driving force in a phase subsequent to the middle of a gear shift operation while preventing occurrence of a gear shift shock and to rapidly perform a gear shift after passing through the intermediate shift stage when a jump gear shift via the intermediate shift stage is performed with input switching.

Specifically, in this embodiment, when input switching in which the frictional engagement element (the first clutch C1 and the second clutch C2) serving as the engagement maintaining element that can transmit power from the engine 1 (the driving force source) to the second gear shift unit 32 is switched at the time of passing through the intermediate shift stage occurs in the course of performing a gear shift via the intermediate shift stage, torque phase control in which a torque phase control execution time is shorter than that when input switching does not occur is performed.

The torque phase control is performed by the ECU 5. Accordingly, in the ECU 5, a functional part that performs the torque phase control is configured as a torque phase control unit in the disclosure.

A routine of the torque phase control according to this embodiment will be described below with reference to the flowchart illustrated in FIG. 5. This flowchart is repeatedly performed at predetermined intervals after a start switch of the vehicle is turned on.

First, in Step ST1, it is determined whether a gear shift request of the automatic transmission 3 occurs and the gear shift request is a jump downshift request via an intermediate shift stage. That is, it is determined whether a required shift stage which is set based on the gear shift map is a shift stage lower by two or more stages than a current shift stage and the gear shift to the required shift stage needs to be performed via an intermediate shift stage. Examples of the jump downshift request via an intermediate shift stage include a case in which a downshift from the fifth shift stage to the second shift stage is requested due to an increase in accelerator depression amount detected by the accelerator depression sensor 84 during the vehicle traveling at the fifth shift stage and the third shift stage is set as the intermediate shift stage and a case in which a downshift from the eighth shift stage to the third shift stage is requested due to an increase in accelerator depression amount detected by the accelerator depression sensor 84 during the vehicle traveling at the eighth shift stage and the fifth shift stage is set as the intermediate shift stage.

For each combination of shift stages before and after a jump downshift, information on whether the gear shift needs to be performed via an intermediate shift stage and information on a selected intermediate shift stage are stored in advance in the ROM in consideration of the clutch heat quantity as described above. When a jump downshift request occurs, it is determined whether the jump downshift needs to be performed via an intermediate shift stage with reference to the information stored in the ROM. When it is determined that the jump downshift needs to be performed via an intermediate shift stage, the intermediate shift stage is set depending on the combination of shift stages before and after the gear shift. The information on whether the gear shift needs to be performed via an intermediate shift stage and the information on a selected intermediate shift stage may be set depending on the combination of shift stages before and after the jump downshift and the vehicle speed (which corresponds to the rotation speed of the output shaft $3b$ calculated based on the output signal of the output shaft rotation speed sensor 83). For example, when the combination of shift stages before and after the gear shift is the same but the vehicle speed is equal to or higher than a predetermined value, it is determined that the gear shift needs to be performed via an intermediate shift stage. When the vehicle speed is lower than the predetermined value, it is determined that the gear shift does not need to be performed via an intermediate shift stage.

When a jump downshift request via an intermediate shift stage does not occur, that is, when the gear shift request of the automatic transmission 3 is an upshift request, when the gear shift request is a downshift request for changing only one shift stage, when the gear shift request is a jump downshift request in which the clutch heat quantity can be controlled low without passing through an intermediate shift stage, or when the gear shift request of the automatic transmission 3 does not occur, the determination result of Step ST1 is negative and the routine restarts. In this case, when a gear shift request other than the jump downshift request via the intermediate shift stage occurs, a gear shift corresponding to the gear shift request is performed.

On the other hand, when a jump downshift request via an intermediate shift stage occurs and the determination result of Step ST1 is positive, it is determined in Step ST2 whether the rotation speed of the input shaft $3a$ approaches the synchronous rotation speed of the intermediate shift stage. That is, a gear shift from a shift stage before the gear shift starts to the intermediate shift stage starts and it is determined whether the rotation speed of the input shaft $3a$ approaches the synchronous rotation speed of the intermediate shift stage with progress of the gear shift. For example, it is determined whether the rotation speed of the input shaft $3a$ is within a predetermined deviation from the synchronous rotation speed of the intermediate shift stage. Here, since the downshift to the intermediate shift stage is performed, it is determined whether the rotation speed of the input shaft $3a$ is lower than the synchronous rotation speed of the intermediate shift stage and the difference therebetween is within a predetermined deviation. The deviation serving as a threshold value is set by experiment or simulation.

When the rotation speed of the input shaft $3a$ does not approach the synchronous rotation speed of the intermediate shift stage and the determination result of Step ST2 is negative, the routine restarts. That is, it is determined that the timing at which the torque phase control starts does not arrive yet and the routine restarts. That is, in a period in which the jump downshift request via an intermediate shift stage occurs, it is waited that the rotation speed of the input shaft $3a$ approaches the synchronous rotation speed of the intermediate shift stage.

On the other hand, when the rotation speed of the input shaft $3a$ approaches the synchronous rotation speed of the intermediate shift stage and the determination result of Step ST2 is positive, it is determined in Step ST3 whether the intermediate shift stage via which the current jump downshift is performed is accompanied by input switching. For example, when a jump downshift from the eighth shift stage to the third shift stage is performed via the fifth shift stage as an intermediate shift stage, the input clutch is switched from the second clutch C2 to the first clutch C1 (thereafter, a downshift to the third shift stage starts and thus the input clutch is switched to the first clutch C1) at the time of passing through the fifth shift stage and thus the determination result of Step ST3 is positive. On the other hand, for example, when a jump downshift from the fifth shift stage to the second shift stage is performed via the third shift stage as an intermediate shift stage, the first clutch C1 is maintained as the input clutch at the time of passing through the third shift stage and the determination result of Step ST3 is negative.

When the intermediate shift stage via which the jump downshift is performed is not accompanied by input switching, the determination result of Step ST3 is negative and the torque phase control is performed with the target torque phase time set to α in Step ST4. The target torque phase time α is set based on a parameter (such as an accelerator depression amount or a vehicle speed) indicating a required driving force from a driver (is set to be longer than a target torque phase time β to be described later), and is set by experiment or simulation and is stored as a map (a target torque phase time map) in the ROM. That is, in Step ST4, the target torque phase time α is read from the target torque phase time map and oil pressures which are supplied to and discharged from the frictional engagement elements are controlled such that the target torque phase time α is achieved. Specifically, the disengagement-side clutch torque Tcdrn and the engagement-side clutch torque Tcapl are calculated using Equations (1) and (2) such that the target torque phase time α is achieved. For example, when a jump downshift from the fifth shift stage to the second shift stage is performed via the third shift stage as an intermediate shift stage, the clutch torque of the second clutch C2 which is a disengagement-side clutch and the clutch torque of the third clutch C3 which is an engagement-side clutch are calculated and the torque phase control is performed such that the target torque phase time α at the time of passing through the intermediate shift stage (the third shift stage) is achieved.

After the torque phase control is performed with the target torque phase time α set in this way, a gear shift from the intermediate shift stage to the required shift stage is performed. When the required shift stage is set, the current gear shift (the jump downshift via the intermediate shift stage) ends.

On the other hand, when the intermediate shift stage via which the jump downshift is performed is accompanied by input switching, the determination result of Step ST3 is positive and the torque phase control is performed with the target torque phase time set to β in Step ST5. The target torque phase time β is set to be shorter than the target torque phase time α. In this case, the target torque phase time β may be calculated by multiplying the target torque phase time α read from the target torque phase time map by a predetermined correction coefficient (a correction coefficient less than 1), or a map for calculating the target torque phase time β (an input-switching target torque phase time map; a map for determining the target torque phase time β depending on a combination of a shift stage before starting the gear shift and the intermediate shift stage, or the like) may be set by experiment or simulation and stored in the ROM and the target torque phase time β may be read from the input-switching target torque phase time map. In Step ST5, oil pressures which are supplied to and discharged from the frictional engagement elements are controlled such that the target torque phase time β is achieved. Specifically, the disengagement-side clutch torque Tcdrn and the engagement-side clutch torque Tcapl are calculated using Equations (1) and (2) such that the target torque phase time β is achieved. For example, when a jump downshift from the eighth shift stage to the third shift stage is performed via the fifth shift stage as an intermediate shift stage, the clutch torque of the first brake B1 which is a disengagement-side clutch and the clutch torque of the first clutch C1 which is an engagement-side clutch are calculated and the torque phase control is performed such that the target torque phase time β at the time of passing through the intermediate shift stage (the fifth shift stage) is achieved.

After the torque phase control is performed with the target torque phase time β set in this way, a gear shift from the intermediate shift stage to the required shift stage is performed. When the required shift stage is set, the current gear shift (the jump downshift via the intermediate shift stage) ends.

When the short target torque phase time is set in this way, switching of the input clutch is promptly performed. For example, in the above-mentioned case, the target torque phase time at the time of passing through the fifth shift stage is set to be short and the time in which the input clutch is switched from the second clutch C2 to the first clutch C1 is shortened.

The operations of Steps ST4 and ST5 correspond to the "operation, which is performed by the torque phase control unit, of performing the torque phase control in the course of performing the gear shift via the intermediate shift stage such that the torque phase control execution time when input switching in which the frictional engagement element serving as the engagement maintaining element is switched at the time of passing through the intermediate shift stage occurs is shorter than the torque phase control execution time when input switching does not occur" in the claims The above-mentioned operations are repeatedly performed at predetermined intervals.

FIG. 6 is a diagram illustrating an example of a change of the shift stage when a jump downshift via an intermediate shift stage is performed. "Gear shift patterns" in FIG. 6 indicate a shift stage before the gear shift, an intermediate shift stage, and a required shift stage through which the jump downshift progresses. A "first gear shift engagement element" is an engagement-side frictional engagement element (which is switched from disengagement to engagement) at the time of a gear shift from the shift stage before the gear shift to the intermediate shift stage. A "second gear shift engagement element" is a disengagement-side frictional engagement element (which is switched from engagement to disengagement) at the time of a gear shift from the intermediate shift stage to the required shift stage. An "input clutch (engagement maintaining element)" indicates switching of the input clutch at the time of passing through the intermediate shift stage.

As can be seen from FIG. 6, when the jump downshift from the fifth shift stage to the second shift stage is performed via the third shift stage as an intermediate shift stage, the third clutch C3 serves as the first gear shift engagement element at the time of the gear shift from the fifth shift stage to the third shift stage, and the third clutch C3 serves as the second gear shift disengagement element at the time of the gear shift from the third shift stage to the second shift stage. In this case, the first clutch C1 is maintained as the input clutch. Accordingly, in this case, the target torque phase time is set to be long (α).

On the other hand, when the jump downshift from the eighth shift stage to the third shift stage is performed via the fifth shift stage as an intermediate shift stage, the first clutch C1 serves as the first gear shift engagement element at the time of the gear shift from the eighth shift stage to the fifth shift stage, and the second clutch C2 serves as the second gear shift disengagement element at the time of the gear shift from the fifth shift stage to the third shift stage. In this case, the input clutch is switched from the second clutch C2 to the first clutch C1. Accordingly, in this case, the target torque phase time is set to be short (β).

The target torque phase time in a case in which the torque phase control is performed in Step ST4 and a case in which the torque phase control is performed in Step ST5 will be described below with reference to FIGS. 7 and 8.

Figure 7:
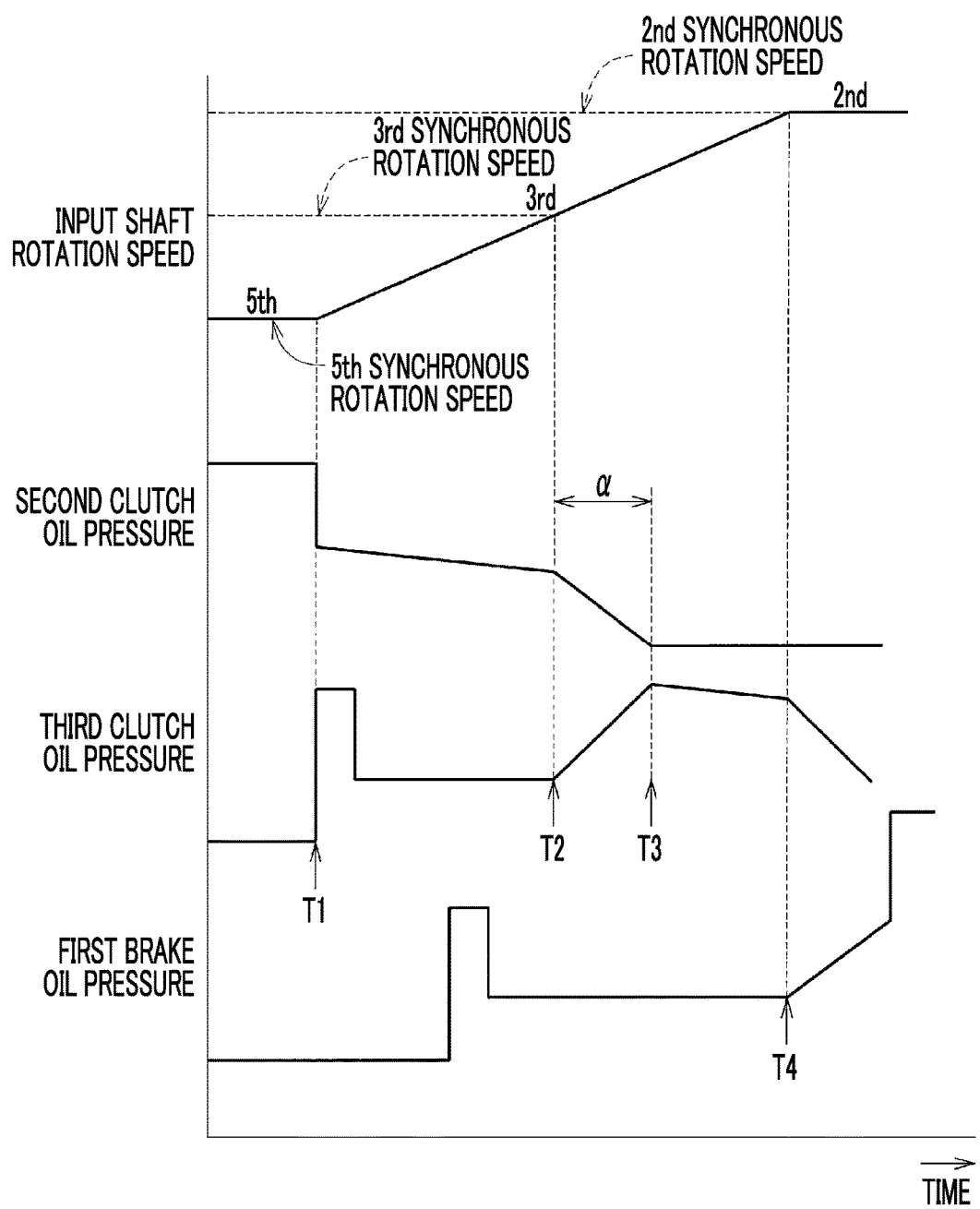
FIG. 7 is a timing chart illustrating changes of an input shaft rotation speed and hydraulic instruction values of frictional engagement elements at the time of a jump downshift from a fifth shift stage to a second shift stage using a third shift stage as an intermediate shift stage.

FIG. 7 is a timing chart illustrating changes of an input shaft rotation speed and hydraulic instruction values of the frictional engagement elements at the time of a jump downshift from the fifth shift stage to the second shift stage using the third shift stage as an intermediate shift stage in the case in which the torque phase control is performed in Step ST4 (a case in which the intermediate shift stage via which the jump downshift is performed is not accompanied by input switching). FIG. 8 is a timing chart illustrating changes of an input shaft rotation speed and hydraulic instruction values of the frictional engagement elements at the time of a jump downshift from the eighth shift stage to the third shift stage using the fifth shift stage as an intermediate shift stage in the case in which the torque phase control is performed in Step ST5 (a case in which the intermediate shift stage via which the jump downshift is performed is accompanied by input switching).

In the case in which the intermediate shift stage via which the jump downshift is performed is not accompanied by input switching, an operation of disengaging the second clutch C2 is started and fast filling which is preparation for engagement of the third clutch C3 is performed, at time T1 in FIG. 7. Thereafter, the hydraulic instruction value of the second clutch C2 decreases gradually and the rotation speed of the input shaft 3a increases to the synchronous rotation speed of the third shift stage. The torque phase control in which the operation of disengaging the second clutch C2 and the operation of engaging the third clutch C3 are performed in parallel (replacement of the clutch is performed) is started at a time point (time T2) at which the rotation speed of the input shaft 3a approaches the synchronous rotation speed of the third shift stage. The target torque phase time in which the torque phase control is performed is set to α (which is longer than β) based on a parameter (such as an accelerator depression amount or a vehicle speed) indicating a required driving force from a driver. That is, a period α from time T2 to time T3 in the drawing is set as the target torque phase time. Thereafter, the hydraulic instruction value of the third clutch C3 decreases gradually and the torque phase control in which the operation of disengaging the third clutch C3 and the operation of engaging the first brake B1 are performed in parallel (replacement of the clutch is performed) is started at a time point (time T4) at which the rotation speed of the input shaft 3a approaches the synchronous rotation speed of the second shift stage. In this case, the target torque phase time is set to be longer by a predetermined time than the target torque phase time α.

On the other hand, in the case in which the intermediate shift stage via which the jump downshift is performed is accompanied by input switching, the operation of disengaging the first brake B1 is started and fast filling which is preparation for engagement of the first clutch C1 is performed, at time T5 in FIG. 8. Thereafter, the hydraulic instruction value of the first brake B1 decreases gradually and the rotation speed of the input shaft 3a increases to the synchronous rotation speed of the fifth shift stage. The torque phase control in which the operation of disengaging the first brake B1 and the operation of engaging the first clutch C1 are performed in parallel (replacement of the clutch is performed) is started at a time point (time T6) at which the rotation speed of the input shaft 3a approaches the synchronous rotation speed of the fifth shift stage. The target torque phase time in which the torque phase control is performed is set to β which is shorter than the target torque phase time α. That is, a period β from time T6 to time T7 in the drawing is set as the target torque phase time. In the target torque phase time, the hydraulic instruction value of the second clutch C2 decreases. Accordingly, switching of the input clutch from the second clutch C2 to the first clutch C1 is promptly performed. That is, the time in which the input clutch is switched is shortened. The torque phase control in which the operation of disengaging the second clutch C2 and the operation of engaging the third clutch C3 are performed in parallel (replacement of the clutch is performed) is started at a time point (time T8) at which the rotation speed of the input shaft 3a approaches the synchronous rotation speed of the third shift stage.

The target torque phase time at the time of passing through the intermediate shift stage (the period from time T6 to time T7) in the case in which the intermediate shift stage via which the jump downshift is performed is accompanied by input switching is shorter than the target torque phase time at the time of passing through the intermediate shift stage (the period from time T2 to time T3) in the case in which the intermediate shift stage via which the jump downshift is performed is not accompanied by input switching. Accordingly, when the intermediate shift stage is accompanied by input switching, it is possible to promptly perform engagement of the engagement-side frictional engagement element at the time of passing through the intermediate shift stage and to rapidly perform the gear shift after passing through the intermediate shift stage.

As described above, in this embodiment, when a jump downshift via an intermediate shift stage is performed and input switching occurs at the time of passing through the intermediate shift stage, the torque phase control is performed with the target torque phase time set to be shorter than that when input switching does not occur. Accordingly, it is possible to promptly perform engagement of the engagement-side frictional engagement element at the time of passing through the intermediate shift stage, to keep a driving force in a phase subsequent to the middle of the gear shift operation high while preventing occurrence of a gear shift shock, and to rapidly perform the gear shift after passing through the intermediate shift stage.

(Other embodiments) The above-mentioned embodiment is exemplary in all respects and does not serve as a basis of restrictive analysis. Therefore, the technical scope of the disclosure is not limited to only the above-mentioned embodiment, but is defined by the description of the appended claims. The technical scope of the disclosure includes all modifications within a meaning and a range equivalent to the claims.

The above-mentioned embodiment and modified example describe an example in which the vehicle 100 is of an FF type. However, the disclosure is not limited thereto and the vehicle may be of a front engine-rear drive (FR) type or of a four-wheel driven type.

The jump downshift via an intermediate shift stage which has been mentioned above includes an overlap gear shift in which a single downshift (a one-step downshift) is continuously performed in a broad sense.

The torque phase control according to the disclosure is not limited to a power-on downshift, but can be applied to a power-off upshift. In this case, when a jump upshift via an intermediate shift stage is performed and input switching occurs at the time of passing through the intermediate shift stage, the torque phase control is performed with a target torque phase time set to be shorter than that when input switching does not occur. For example, when a jump upshift from the fourth shift stage to the eighth shift stage using the sixth shift stage as an intermediate shift stage is performed (when input switching occurs at the time of passing through the intermediate shift stage), the torque phase control is performed with the target torque phase time set to be shorter than that when a jump upshift from the second shift stage to the fifth shift stage using the third shift stage as an intermediate shift stage is performed (when input switching does not occur at the time of passing through the intermediate shift stage).

An example in which the torque phase control execution time is determined by the target torque phase time has been described above, but the torque phase control execution time may be determined by setting a gradient of the hydraulic instruction value at the time of replacement of the clutch.

The disclosure can be used for a controller for a stepped automatic transmission which is mounted in a vehicle and which can perform a jump gear shift via an intermediate shift stage.

The embodiment of the disclosure may be defined as follows. There is provided a controller for a stepped automatic transmission, the stepped automatic transmission including a plurality of frictional engagement elements configured to be an engagement maintaining element that transmits power from a driving force source to a gear shift unit, the stepped automatic transmission being configured to set one of a plurality of shift stages by selectively causing the plurality of frictional engagement elements to engage with each other, the controller including an electronic control unit configured to: perform torque phase control of replacing a frictional engagement element that is to be disengaged and a frictional engagement element that is to be engaged at a time of a gear shift; perform the torque phase control via an intermediate shift stage between a current shift stage and a required shift stage required depending on driving conditions when a shift stage difference between the current shift stage and the required shift stage is equal to or larger than two stages while the gear shift is required; and perform the torque phase control in the course of performing the gear shift via the intermediate shift stage such that a torque phase control execution time when the frictional engagement element serving as the engagement maintaining element is switched at a time of passing through the intermediate shift stage is shorter than the torque phase control execution time when the frictional engagement element serving as the engagement maintaining element is not switched at a time of passing through the intermediate shift stage. When a power-on downshift is requested and when a power-off upshift is requested, the electronic control unit may be configured to perform the torque phase control in the course of performing the gear shift via the intermediate shift stage such that the torque phase control execution time when the frictional engagement element serving as the engagement maintaining element is switched at a time of passing through the intermediate shift stage is shorter than the torque phase control execution time when the frictional engagement element serving as the engagement maintaining element is not switched at a time of passing through the intermediate shift stage. The electronic control unit may be configured to set a target torque phase control execution time and to perform the torque phase control.

What is claimed is:

1. A controller for a stepped automatic transmission, the stepped automatic transmission including a plurality of frictional engagement elements configured to be an engagement maintaining element that transmits power from a driving force source to a gear shift unit, the stepped automatic transmission configured to set one of a plurality of shift stages by selectively causing the plurality of frictional engagement elements to engage with each other, the controller comprising an electronic control unit configured to:
   perform torque phase control of replacing a frictional engagement element that is to be disengaged and a frictional engagement element that is to be engaged at a time of a gear shift;
   perform the torque phase control via an intermediate shift stage between a current shift stage and a required shift stage required depending on driving conditions when a shift stage difference between the current shift stage and the required shift stage is equal to or larger than two stages while the gear shift is required; and
   perform the torque phase control in the course of performing the gear shift via the intermediate shift stage such that a torque phase control execution time when the frictional engagement element serving as the engagement maintaining element is switched at a time of passing through the intermediate shift stage is shorter than the torque phase control execution time when the frictional engagement element serving as the engagement maintaining element is not switched at a time of passing through the intermediate shift stage.

2. The controller according to claim 1, wherein when a power-on downshift is requested and when a power-off upshift is requested, the electronic control unit is configured to perform the torque phase control in the course of performing the gear shift via the intermediate shift stage such that the torque phase control execution time when the frictional engagement element serving as the engagement maintaining element is switched at a time of passing through the intermediate shift stage is shorter than the torque phase control execution time when the frictional engagement element serving as the engagement maintaining element is not switched at a time of passing through the intermediate shift stage.

3. The controller according to claim 1, wherein the electronic control unit is configured to
   set a target torque phase control execution time and,
   perform the torque phase control.

* * * * *